US012338956B2

(12) United States Patent
Bergan

(10) Patent No.: US 12,338,956 B2
(45) Date of Patent: Jun. 24, 2025

(54) INSULATED TANK WITH INTEGRATED OR OPERATIVELY CONNECTED SUPPORT SYSTEM

(71) Applicant: Lattice International AS, Billingstad (NO)

(72) Inventor: Pål G. Bergan, Nesøya (NO)

(73) Assignee: Lattice International AS, Billingstad (NO)

( * ) Notice: Subject to any disclaimer, the term of this patent is extended or adjusted under 35 U.S.C. 154(b) by 102 days.

(21) Appl. No.: 18/043,885

(22) PCT Filed: Sep. 3, 2021

(86) PCT No.: PCT/NO2021/050184
§ 371 (c)(1),
(2) Date: Mar. 2, 2023

(87) PCT Pub. No.: WO2022/050849
PCT Pub. Date: Mar. 10, 2022

(65) Prior Publication Data
US 2023/0324005 A1 Oct. 12, 2023

(30) Foreign Application Priority Data
Sep. 4, 2020 (NO) .................................. 20200965

(51) Int. Cl.
*F17C 3/02* (2006.01)
(52) U.S. Cl.
CPC ....................... *F17C 3/02* (2013.01)
(58) Field of Classification Search
CPC .. B65D 90/12; F17C 13/08; F17C 2201/0104; F17C 2201/032;
(Continued)

(56) References Cited

U.S. PATENT DOCUMENTS 3,251,602 A * 5/1966 Williams ............... F04B 53/166
277/553
3,547,302 A 12/1970 Jackson et al.
(Continued)

FOREIGN PATENT DOCUMENTS

CN 210372876 U 4/2020
DE 102004015295 A1 10/2004
(Continued)

OTHER PUBLICATIONS

Westbye, Daniel, International Search Report; PCT/NO2021/050184; Date of mailing: Dec. 2, 2021; 3 pages.
(Continued)

*Primary Examiner* — Nathan J Jenness
*Assistant Examiner* — Madison L Poos
(74) *Attorney, Agent, or Firm* — Bradley Arant Boult Cummings LLP

(57) ABSTRACT

The invention meets the objective by providing an insulated tank system, comprising an inner tank, thermal insulation external to the inner tank, an inlet and an outlet or a combined inlet and outlet from outside the tank to inside the inner tank, for filling and emptying of fluid, wherein the inner tank contain fluid when in operation. The tank system is distinguished in that it further comprises thermal insulation in the form of insulation block elements arranged side by side externally on the inner tank, with a gap between the insulation block elements at least on the external side thereof, wherein the tank system further comprises a support structure comprising one or more block elements, wherein each block element face and contact an insulation block element, directly or via one or more intermediate layers, wherein the support structure comprises structure for lifting the tank via the support structure, wherein the tank can be lifted and handled by merely loading the external insulation
(Continued)

block elements facing said block elements without directly loading the inner tank, and wherein thermal contraction or expansion are taken up by the gaps between the block insulation elements.

14 Claims, 9 Drawing Sheets

(58) Field of Classification Search
CPC ...... F17C 2203/0329; F17C 2205/0103; F17C 2270/0107; F17C 3/02; F17C 3/027; F17C 1/12; F17C 2203/0304; F17C 2203/0358
USPC .............. 220/560.06, 560.08, 560.1, 560.12, 220/560.15, 592.2, 592.26, 592.27
See application file for complete search history.

(56) References Cited

U.S. PATENT DOCUMENTS

| | | | |
|---|---|---|---|
| 3,769,118 | A | 10/1973 | Tariel et al. |
| 4,050,609 | A | 9/1977 | Okamoto et al. |
| 5,727,492 | A * | 3/1998 | Cuneo ..................... B63B 25/16 220/560.08 |
| 6,880,719 | B1 | 4/2005 | Sutton et al. |
| 6,971,537 | B2 * | 12/2005 | Enright, Jr. ........... F17C 13/081 220/560.11 |
| 8,757,422 | B2 * | 6/2014 | Nishizaki ................ F17C 3/04 220/560.12 |
| 8,807,382 | B1 | 8/2014 | Haberbusch et al. |
| 2010/0018225 | A1 | 1/2010 | Yang et al. |

FOREIGN PATENT DOCUMENTS

| | | | | |
|---|---|---|---|---|
| DE | 102004015295 | B4 | 4/2006 | |
| ES | 2929501 | T3 * | 11/2022 | ............... F17C 3/04 |
| JP | H06293290 | A | 10/1994 | |
| JP | 3111658 | U | 7/2005 | |
| JP | 2007218317 | A | 8/2007 | |
| JP | 2016161116 | A | 9/2016 | |
| JP | 6435517 | B2 | 12/2018 | |
| KR | 20160015437 | A | 2/2016 | |
| KR | 20160074327 | A | 6/2016 | |
| KR | 101647444 | B1 | 8/2016 | |
| KR | 20160119363 | A | 10/2016 | |
| KR | 20160148307 | A | 12/2016 | |
| KR | 20180029118 | A | 3/2018 | |
| NO | 328904 | B1 | 6/2010 | |
| NO | 20200964 | A1 | 3/2022 | |
| WO | WO-9810982 | A1 | 3/1998 | |
| WO | WO-2005093315 | A1 * | 10/2005 | ............. B63B 25/16 |
| WO | WO-2012148154 | A2 | 11/2012 | |
| WO | WO-2015073719 | A1 | 5/2015 | |
| WO | WO-2016018038 | A1 | 2/2016 | |
| WO | WO-2019124628 | A1 | 6/2019 | |
| WO | WO-2020050515 | A1 | 3/2020 | |
| WO | WO-2020251373 | A1 | 12/2020 | |

OTHER PUBLICATIONS

Westbye, Daniel; International Search Report; PCT/NO2021/050183; Date of mailing: Nov. 25, 2021; 3 pages.
Lee, Yeong-Beom, et al.; Development of Reinforced Polyurethane Foam Insulator Using HFCS as Blowing Agent; R&D Division, Korea Gas Corporation; <http://www.ivt.ntnu.no/ept/fag/tep4215/innhold/LNG%0Conferences/2007/fscommand/PO_11_Y_Lee_s.pdf>; Downloaded from the Internet on Feb. 22, 2023; 16 pages.
Bergan, Pål G., "Tank Feasible for Cryogenic Service", U.S. Appl. No. 18/043,785, filed Mar. 2, 2023, 71 pages.

* cited by examiner

INSULATED TANK WITH INTEGRATED OR OPERATIVELY CONNECTED SUPPORT SYSTEM

TECHNICAL FIELD

The present invention relates to systems or arrangements for handling tanks for storage and transport of fluids. More specifically, the invention provides an insulated tank with integrated or operatively connected support system for, particularly feasible for large cryogenic tanks, and a method of fabricating and installing the tank with insulation.

BACKGROUND ART

Safe storage and handling of tanks containing fluids can be crucial for safety, health and the environment. Numerous fluids are preferably stored and transported at temperature far below or far above ambient temperature. Insulated tanks for storage and transport of cryogenic fluid such as liquid hydrogen is one example of tanks from which leakage is not acceptable.

Specific loading conditions on externally insulated tanks may come from fabrication phase of the tanks, such as assembly, lifting, transport and installment, and operational phase where loading may be caused by variable temperatures, variable pressure and variable weight of cargo, as well as inertia loading caused by motion of a vehicle or ship onto which the tank is installed. Good design for such loads is crucial for the safety of people, the environment and asset. This is particularly true when damage can lead to leakage of explosive, flammable, poisonous or very hot or cold fluids.

The fluid is contained in a tank structure suited for the purpose with regard to satisfying all safety and code requirements relating to deformations, strength, stability and fatigue integrity under the applicable loading and thermal conditions. A particular challenge for tanks filled with fluid with temperature very different from the initial tank conditions and the surroundings is that the overall size and shape (e.g. radius of curvature) of the tanks will change as a function of the thermal properties of the tank (depending on the secant coefficient of thermal expansion/contraction). Such geometric changes typically have consequences for the way the tank should be supported in order to avoid incompatible and severe stress on the tank and the support structure, and ultimately the foundation onto which the tank is standing. This interaction problem becomes even more severe when the tank is covered with a light and weak insulation material on the outside.

For some insulated tanks, a secondary containment structure is arranged outside the thermal insulation, with an outer shell protecting the insulation. Clearly, thermal contraction (or expansion) of the inner tank has consequences for the outer shell depending on the way the two layers are connected and the way the outer shell is designed. In a simple case the outer protective shell for the thermal insulation is a thin plate or "skin" with corrugation which can adapt to thermal deformations of the inner tank. Tanks, such as independent tanks for liquid natural gas (LNG) at −163 C.° are normally supported on fixed and sliding wood or plastic blocks which will provide contact between the inner tank and the foundation at ambient temperature on the outside. This leads to so called "thermal bridges" which imply increased heat ingress, resulting in undesirable rise of temperature and pressure in the contained fluid if boil-off gas due to the heat ingress is not vented from the tank.

Some cryogenic tank applications may require extra high-performance thermal insulation. Vacuum insulation provides an ideal solution in the sense that ideal vacuum prevents heat ingress by thermal conduction and convection. Moreover, vacuum type insulation may be the only acceptable method for containment of fluids such as liquid hydrogen (LH2) around −253° C. Conventional vacuum insulated tanks are designed as double wall tanks where the outer shell or "jacket" must be designed to carry the pressure difference between atmospheric pressure and near vacuum condition in the layer between the two shells. There are a series of challenges with such tanks having to do with that there must be connecting heat bridges between the two shells, the fact that the outer shell is subject to external pressure that can result in instability and buckling, and that the thermal contraction of the inner tank leads to significant size difference and incompatibility between the two structural layers. For these reasons vacuum type insulation has so far been applied for tanks of limited size, such as a few hundred cubic meters.

The objective of the present invention is to provide a tank or a tank system, uses thereof, and a method being beneficial with respect to one or more of the challenges outlined above.

SUMMARY OF INVENTION

The invention meets the objective by providing an insulated tank or tank system, comprising an inner tank, thermal insulation external to the inner tank, an inlet and an outlet or a combined inlet and outlet from outside the tank to inside the inner tank, for filling and emptying of fluid, wherein the inner tank contain fluid when in operation. The tank system is distinguished in that it further comprises thermal insulation in the form of insulation block elements arranged side by side externally on the inner tank, with gaps between the insulation block elements, at least on the external side thereof, wherein the tank system further comprises a support structure comprising one or more block elements (also termed support block elements, soft support elements or soft supports), wherein each such block element face and is in contact with a corresponding insulation block element, directly or via one or more intermediate layers, wherein the support structure comprises structure for lifting the tank via the support structure, wherein the tank can be lifted and handled by merely loading the external insulation block elements facing said block elements without direct loading attachments to the inner tank, and wherein thermal contraction or expansion are taken up by the gaps between the block insulation elements.

The insulated tank system of the invention is facilitating fabrication, transport, installation, and certification of the tank, without restriction to the maximum size of the tank. The separate or combined inlet and outlet from outside the tank to inside the inner tank is the only structure penetrating the insulation and providing a thermal bridge of significance. The inner tank preferably is a pressure tank, allowing pressures up to at least 5, 15 or 20 bar. No lifting lugs or other similar structure is required, thereby no lifting lugs will have to be removed after installation, and testing and certification of the tank system is simplified.

Dependent claims define preferable embodiments of the tank system of the invention.

The invention also provides a method of fabricating a tank according to the invention. The method is distinguished in that, at a fabrication location or in a ship, to fabricate or provide an inner tank, preferably a pressure tank, to arrange insulation block elements side by side on the inner tank, with a gap in between the insulation block elements, to fabricate or provide an inlet and an outlet, as one combined or separate structures, to fabricate or provide an airtight outer shell structure with a coupling for a vacuum pump, if included in the tank embodiment, to fabricate or provide at least one support structure for operatively building or connecting to the tank, wherein the support structure comprises one or more block elements, each block element has shape matching a specific insulation block element, wherein the support structure comprises structure for lifting the tank via the support structure, allowing lifting and transporting the tank without directly loading the inner tank.

Preferable embodiments are as defined in dependent claims.

Further preferable embodiments and features are evident for the person skilled in the at from the detailed description and the illustrated embodiments.

In the context of the present invention, the support structure means inter alia a structure onto which the tank can rest by having an outer surface section of the tank resting on an upper surface of the support structure matching the shape of the outer surface section of the tank, wherein said upper surface of the support structure has a flat shape, a curved shape, a doubly curved shape, or shapes including combinations thereof corresponding to the outer surface of the tank in the contact area, wherein the contact area is large enough to ensure strain and stress at any point in the contact area remain below a safe limit.

In the context of the invention, the definition of safe stress limit is a maximum stress in any point in the contact area between the tank and block elements not exceeding allowable limits as defined in international gas codes, IGC and IGF for fuel tanks, and codes for pressure tanks, according to ASME. For example, maximum stress not exceeding a requirement with regard to the von Mises yield criterion or a fraction thereof, is an example of a safe limit.

The soft support concept of the invention combined with the block insulation system for the tank, with lateral supports as required, provides significant advantages with respect to fabrication and transport and installation of an insulated tank. More specifically, when lifting a tank of the invention optionally having soft supports and possibly also lateral supports, lifting can take place using the surface area of insulation for carrying the load of the tank, by arranging lifting lines to the support structure, without stressing the insulation and structure unduly. There is no need for lifting lugs attached to the inner tank that would create thermal bridges through the insulation or must be cut away after installation followed by repair of the insulation layer. Thus, no thermal bridges need be introduced, no lifting lugs are required, no removal of lifting lugs are required since no stress level has become critical. There may possibly be no need to retest and/or recertificating the tank containment structure after installation in its intended position for operation except for overall system testing with connected piping etc. The combined contact areas between the support block elements and the insulated tank shall be large enough to ensure acceptable stress at any point, below any critical limit as governed by code rules and regulations. If required, insulation block elements in contact with the support block elements, shall have sufficient stiffness against compression and may be stiffer and stronger compared to other insulation block element that are not in direct contact with the support system. Increased load bearing capacity of the insulation blocks can for example be due to higher density and increased fiber reinforcement in the insulation layer of the block elements.

Thus, the invention provides a thermally insulated cryogenic tank, typically a vacuum insulated type tank, for which an inner tank for fluid containment may have significant thermal contractions after cooling and where the outer airtight layer of the thermal insulation consists of interconnected insulation modules termed insulation block elements which locally follow the contraction of the main tank wherein the tank system comprises an integrated or operatively connected support structure that is equivalently modular through having in total a sufficient number of block element support sections such that the contact pressure against the insulation modules remains acceptable in relation to their load bearing capacity and where each support section has the properties:

the size and shape of the contact area of each block support element fit within the outer surface of corresponding insulation module the contact zone of the block elements against the insulation modules may have a layer of soft material with the ability of adapting to local geometric changes generally caused by thermal expansion or cooling of insulation module for which it provides support and changes of the inner tank itself the contact support sections are connected with a support system that connect the insulated tank with the foundation onto which the tank system is resting and where the interconnecting supporting structures of the support system can move in relation to the overall contraction of the insulated tank in the direction of one point being fully fixed in relation to the underlying foundation without creating unacceptable normal and tangential resisting forces onto the contact surface against the corresponding insulation module

DETAILED DESCRIPTION OF THE INVENTION

Figure 1:
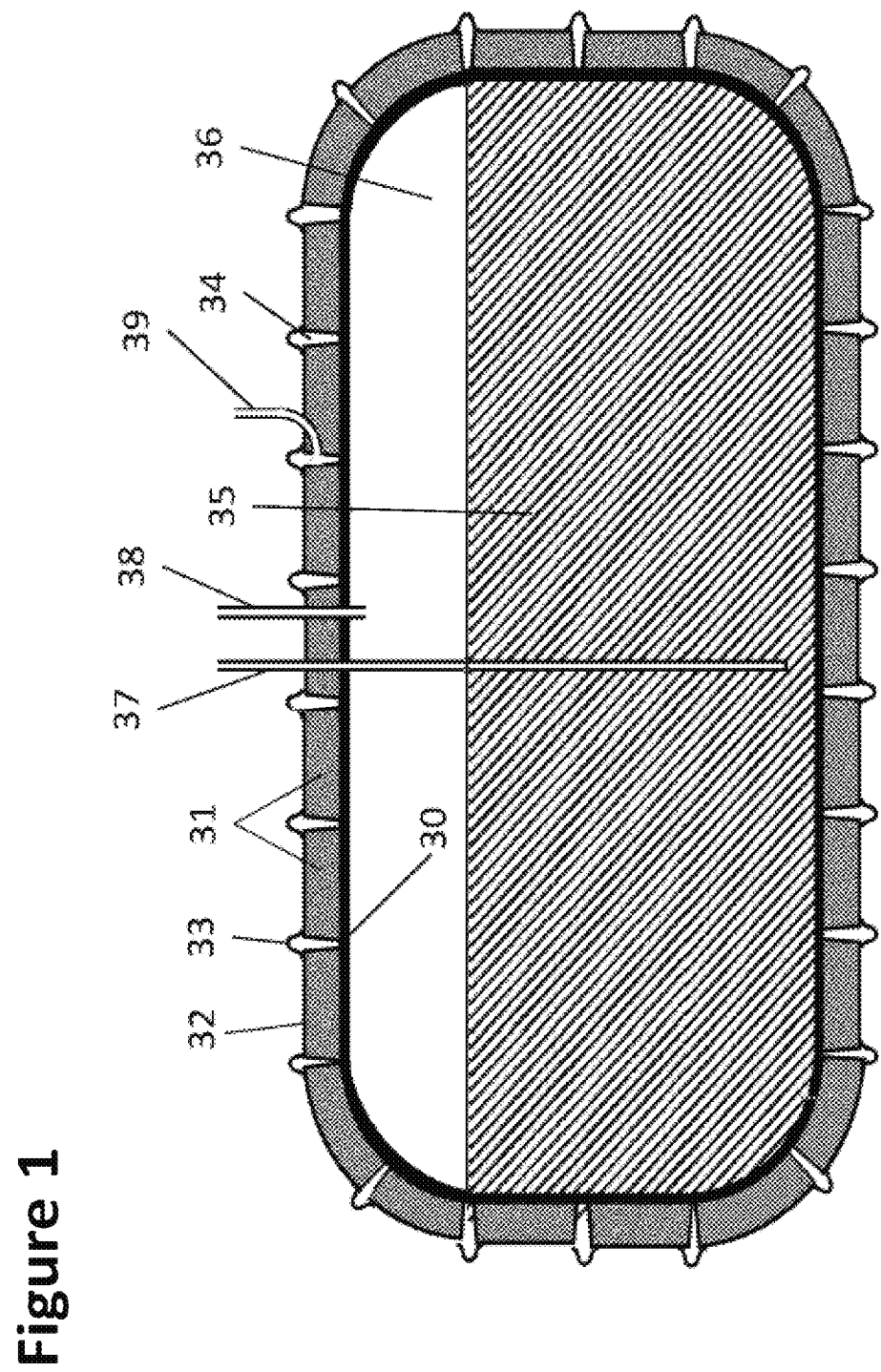
FIG. 1 illustrates in principle a cryogenic pressure vessel with a block insulation system.

FIG. 1 illustrates a cryogenic tank with vacuum type insulation where the vacuum layer consists of blocks of porous insulation material covered by an air leak-tight, flexible, corrugated skin. This figure may be representative for applications for which the present invention can be applied. 30 indicates any type of containment system such as cylinder, sphere, lattice pressure vessel or any type of pressurized or unpressurized prismatic or other shaped containment. The modular vacuum insulation system consists of insulation blocks 31 covering the entire surface of the tank. There is a thin, leak-proof, membrane 32 with corrugation 33 covering the entire outer surface of the tank with the insulation blocks thereby forming an airtight outer shell. The corrugation 33 is an important part of the concept since the main tank 30 will contract significantly when filled with a cryogenic fluid. It is also notable that the insulation blocks are separated by open spaces 34 that serve two main purposes: (1) they prevent the insulation blocks from being squeezed into each other when the main tank contracts due to cooling, and (2) they serve as air drainage channels during the vacuuming process. Clearly the pattern of these gaps is consistent with the pattern of insulation blocks. FIG. 1 also shows the cold liquid 35 inside the tank and a part 36 on top which is in gaseous form. There are also piping 37 and 38 enabling controlled fluid filling from the outside and discharge to the outside. The pipe 39 indicates a connection between the air drainage channels 34 in the insulation and an external vacuuming pump system. The internal pressure within the tank 30 corresponds to vapour pressure which in turn depends on degree of filling and the actual fluid temperature. Additionally, there will be gravitational and dynamic pressure components. An important objective is to achieve a best possible thermal insulation to keep temperature and pressure build-up within acceptable bounds. Thus, the main purpose with vacuum insulation is to achieve best possible thermal insulation.

Figure 2:
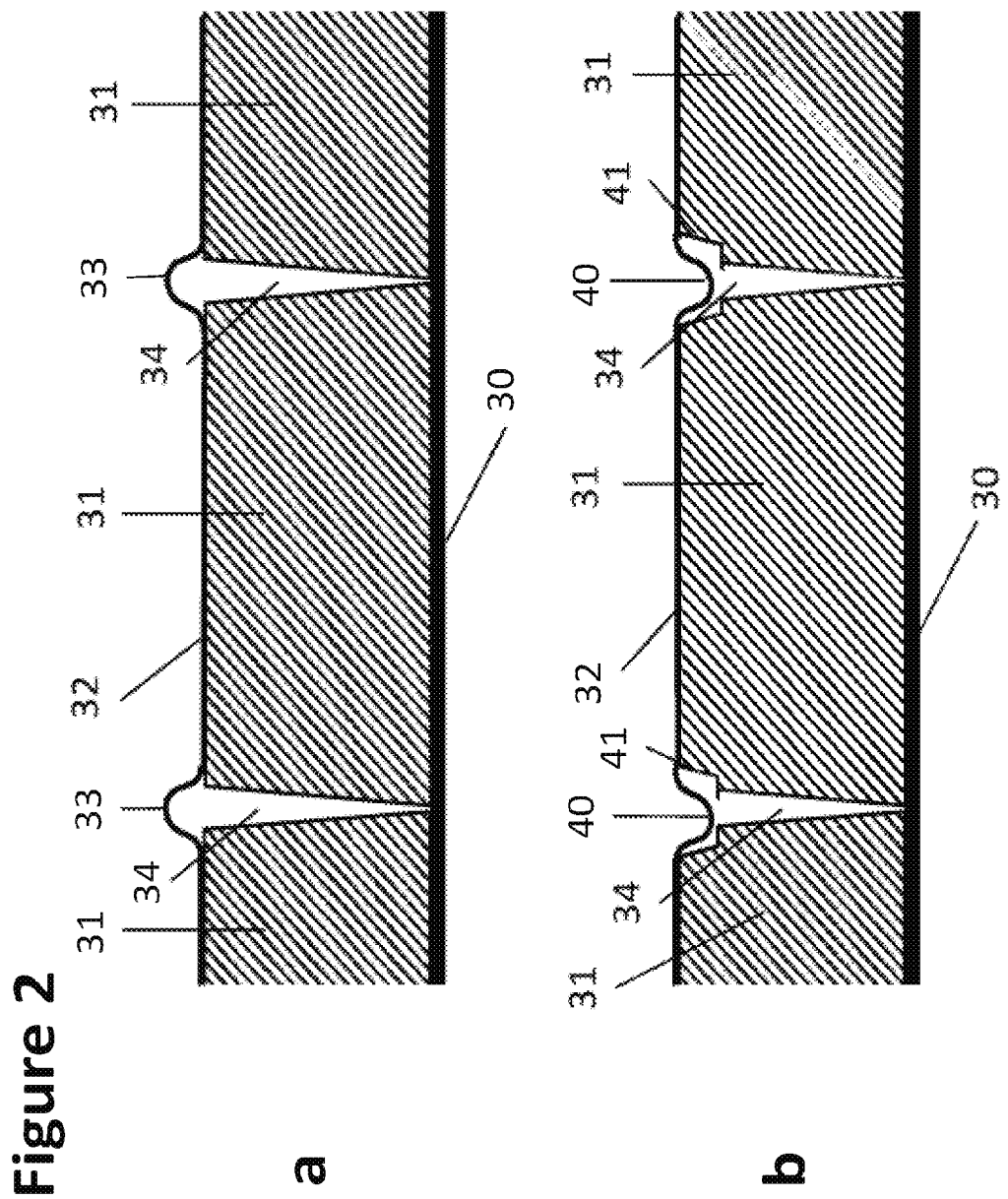
FIGS. 2a and b illustrate details of gaps between insulation block elements and outer shell.

The structural containment 30 contracts while the membrane 32 remains with relatively unchanged temperature of the externally surrounding air or gas. The thermal contraction of the strong and stiff internal tank forces the insulation and membrane to be squeezed together resulting in that the corrugations 33 in between elements 31 will be exposed to compression. It is thus mainly the corrugations that compensate for change of geometry of the stiff, inner tank. Clearly, a support system connected directly with the surface of the flexible membrane will have to account for the overall thermal contraction of the inner tank 30 as well as local deformations. Further, such support system must not interfere with the corrugations themselves. FIGS. 2a and 2b illustrate in further detail two versions of the block vacuum insulation concept. 30 is the outer surface of the fluid containment as described in FIG. 1. Assuming significant cooling of the inner tank 30 with fluid inside, the tank surface will contract correspondingly consistent with thermal properties of the tank material and the imposed lowering of temperature. An indication of contraction in the case of liquid hydrogen at −253° C. inside the tank is about 3 to 6 mm per meter length typically for alloyed austenitic stainless steel. The load bearing element of the insulation system consists of porous or fibrous light-weight insulation blocks 31 which are fixed to the surface of the containment 30 with mechanical and/or glue attachment. The block material must be sufficiently open and porous such that air or gas initially entrapped in the insulation can be fully evacuated as part of the vacuuming procedure. The blocks are separated by initial gaps 34. The shape and width of these gaps preferably should be such that they do not close during cooling and thermal contraction of the fluid containment 30 to avoid overlapping and rather maintain open channels for achieving and maintaining vacuum around the entire tank. Thus, the size and shape of these gaps depend not only on how much the containment contracts but also on the actual size of the blocks. Examples of block sizes may be from 0.5 to 2.5 m whereas other block sizes may be feasible as well. Typical thickness of the insulation blocks may be from 0.1 m to 1 m whereas other thicknesses may be feasible as well. Note that the insulation blocks are flexible and can accommodate the same contraction as the containment at the tank surface whereas the outer part of the block remain rather undeformed due to only small or moderate thermal variations of the externally surrounding gas or air.

A requirement for achieving vacuum is that the vacuum space is fully leak tight and that the external shell remains intact without damage during operation. This is achieved by having a leak-tight outer shell, a membrane, on the outside of the insulation blocks with the ability to comply with the overall thermal contraction of the inner tank. The corrugations spanning the open gap between blocks is key to dealing with the tank contraction. FIG. 2a shows outward corrugation in some further detail while 2b show an alternative inward corrugation 40. Both solutions are fully feasible and function essentially in the same way during tank contraction. The membrane is also subjected to external pressure caused by atmospheric pressure on the outside and vacuum within the insulation layer; hence about one bar external or 0.1 MPa pressure. In the case 2a the pressure works on an outward, arch type geometry 33 that results in a membrane stress component in compression giving a small "push" across the gap. For case 2b the difference is that pressure works on an inward, "hammock" type geometry 40 resulting in a membrane stress component in tension giving a small "pull" across the gap. Both principles will work in practice. An advantage by outward corrugation is that necessary welding of membrane parts becomes more accessible and easier than for the inward case. Inward corrugation requires less space and is less vulnerable to mechanical damage from outside sources. Inward corrugation may also require that the geometry of the gaps between blocks is modified with an additional groove 41 to provide room for the corrugation and thereby avoiding direct contact with the insulation blocks. Regardless, with inward or outward corrugation the external support system for such tanks must also be correspondingly modular and making contact only with the flat or curved membrane surface away from the corrugation zones.

Preferably, the curved or smoothly corrugated parts of the outer shell covering the gaps between insulation block elements and taking up contraction when cooling the inner tank and taking up stretching when heating the inner tank, has a cosine-like shape as seen in cross section along a gap. In positions where two gaps are crossing, the curved part shape preferably is a superimposed cosine like shape. In some embodiments, other smooth, buckling shape type corrugation geometries may apply.

Figure 3:
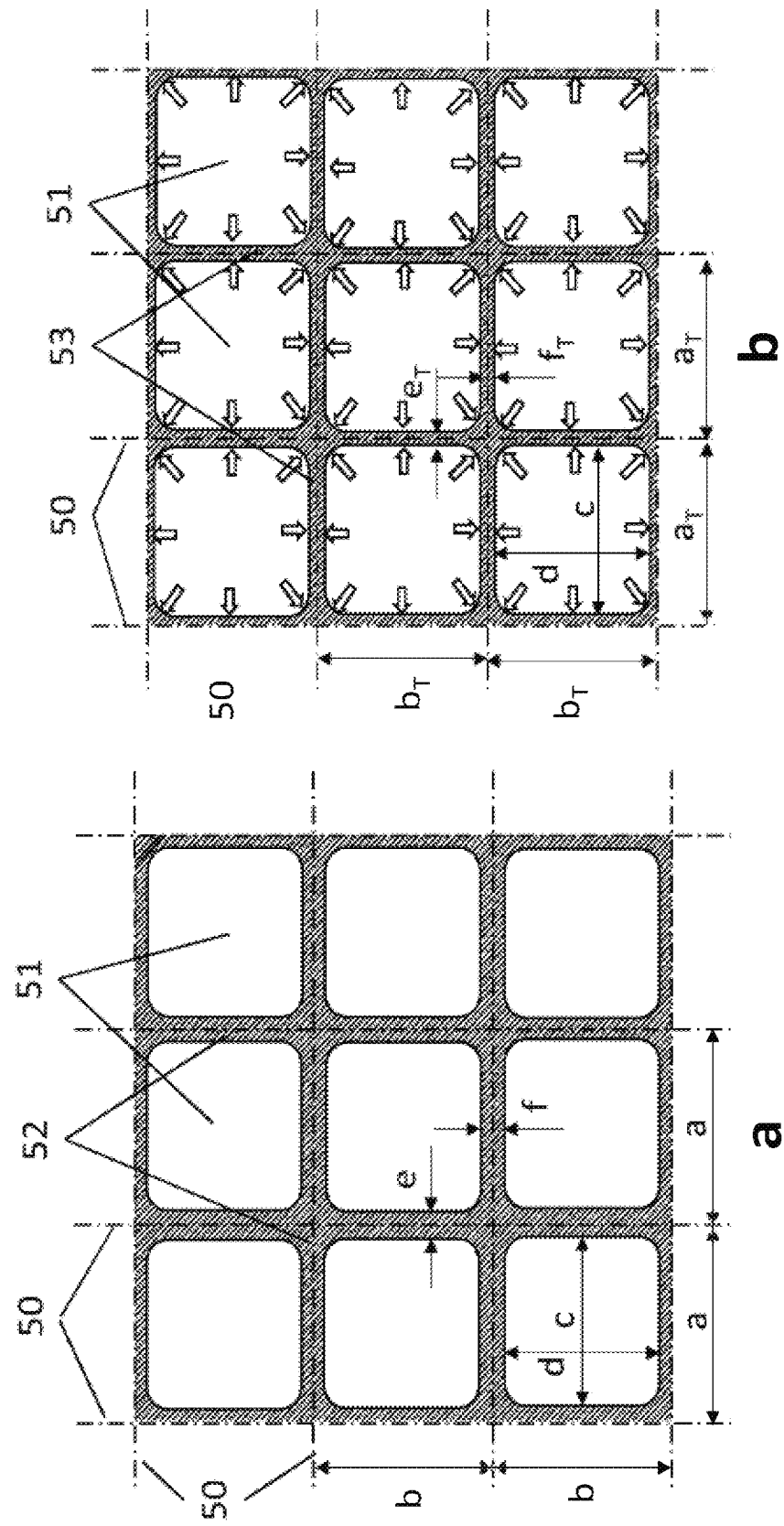
FIGS. 3a and b illustrate insulation block elements and deformations after cooling the inner tank.

FIG. 3 illustrates in further detail the problem of thermal contraction of the inner tank. FIG. 3a shows an outside view of a surface section with 3 by 3 pattern of insulation blocks before the cooling of the main tank has taken place. The lines 50 may be seen as system lines marked on the surface of the inner containment before cooling takes place. The distance between the system lines is a in one direction and b in the other. The figure also shows the membrane areas 51 between corrugations and the corrugation pattern 52 (inward or outward oriented) located between blocks before cooling. The sizes of the contact areas are c in one direction and d in the other. The spans of the corrugations are thus e=a−c in one direction and f=b−d in the other. FIG. 5b illustrates the situation after thermal cooling where the distances between system lines 50 on the inner tank have been reduced to $a_T$ and $b_T$. The actual contraction depends on the temperature change $\Delta T$ after cooling of the tank and the secant modulus of thermal expansion for the tank $\alpha$, thus $$a_T = a(1+\alpha\Delta T), \text{ and } b_T = b(1+\alpha\Delta T) \tag{1}$$

Note that $\Delta T$ is negative for cooling such, as an example, $-273°$ C. for liquid hydrogen in relation to an initial temperature of 20° C. before cooling. The outer membrane is not subject to significant own thermal contraction since it remains at current outside temperature. This means that the thermal contraction of the inner tank must be accommodated by mechanical contraction within the corrugation zones shown shaded in the figure. The span $e_T$ and $f_T$ of the corrugation zones thus become after cooling $$e_T = a_T - c, \text{ and } f_T = b_T - d \tag{2}$$

where the actual mechanical contractions to be taken by the corrugation are $$\Delta e = e_T - e = a\alpha\Delta T, \text{ and } \Delta f = f_T - f = b\alpha\Delta T \tag{3}$$

The contraction to be taken by the corrugation is proportional to the distances between the system lines 50 with a and b. The size of the corrugation spans e and f must be chosen in accordance with what is mechanically feasible which in turn primarily depends on the actual corrugation design. Choosing larger distances a and b means less corrugation and welding and cheaper solution. Numerical simulations show that distances between corrugations of about 2 meters are feasible with the current invention; this is about ten times larger than the current type of corrugation design shown in FIG. 1. The typical block size side dimensions, as represented by a and b, are preferably in the range 0.25 to 2 m, but smaller dimensions are possible and also larger dimensions, especially for less demanding applications than LH2. Corresponding gap sizes are preferably sufficiently wide to retain open gaps at all times, meaning that the curved parts span or gap sizes e and f preferably are larger than the respective strains $\Delta e$ and $\Delta f$, wherein both $\Delta e$ and $\Delta f$ are negative. The gaps g and the corrugation spans are not necessarily identical. However, if $g_a$ and $g_b$ represent initial gap in the two directions, the non-closing condition of the gaps is $$g_a + \Delta e > 0, \text{ and } g_b + \Delta f > 0 \tag{4}$$

As for the curved parts and the widths thereof, the deltas are negative.

Regarding the width of the curved parts, and considering the absolute values of $\Delta e$ and. $\Delta f$, e is preferably at least 2 $\Delta e$, even more preferably at least 3 $\Delta e$ or 5 $\Delta e$, but preferably not wider than 8 $\Delta e$ or 10 $\Delta e$ or 15 $\Delta e$. And likewise, f preferably is at least 2 $\Delta f$, more preferably at least 3 $\Delta f$ or 5 $\Delta f$, but preferably not wider than 8 $\Delta f$, or 10 $\Delta f$ or 15 $\Delta f$. The curved parts preferably have an initial height of at least 0.5 $\Delta e$ and 0.5 $\Delta f$, respectively, to ensure a uniform direction of bending. Since the outer shell in practice will be in a static condition for years, since the inner tank will be held at cryogenic temperature, there is no specific limits on minimum or maximum width of the gap and/or the curved part, since even a plastically strained curved part or a very wide curved part will be airtight. Retaining an open gap is preferred for facilitating vacuum formation in the insulation and avoiding plastic strain in said curved parts, while avoiding a very wide gap is preferable for reducing heat ingress by radiation and for avoiding questioning the robustness of the outer shell. Further reference, for further details on the tanks, is made to the parallel patent application NO 20200964 and the international patent application claiming priority therefrom, wherein the contents of said applications are incorporated herein by reference.

FIG. 3 illustrates the consequences thermal contraction may have for the support system. In case 3a the support connects only with one module and the thermal effect will be limited to the local motion caused by the overall tank contraction plus possibly a slight change in surface geometry for curved contact surfaces. The overall tank motion part can be handled by a sliding mechanism for the support and the local effect by a flexible contact layer on the support. When a support makes contact with several block modules, such as a pattern of 1×2, 1×3, 1×4, 2×2, 2×3 modules and so on, it is seen that the system lines between neighboring contact areas will move closer to each other. This relative motion between contact areas may be relatively small compared to the overall tank contraction and it can thus, as will be described later, be dealt with by way of applying a flexible contact layer on the support surface.

Figure 4:
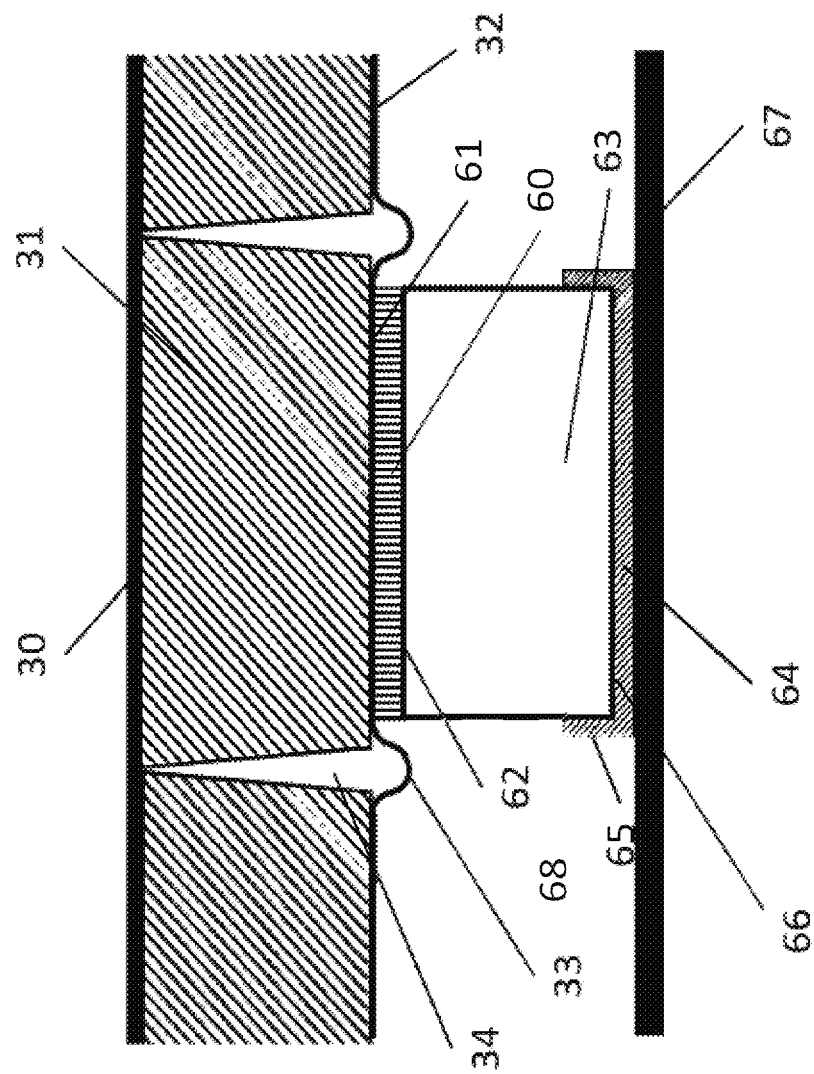
FIG. 4 illustrates details on block element, soft layer and insulation block element design.

FIG. 4 shows an implementation of the current invention for support under a single block module 31. 60 is an intermediary, soft, contact zone layer that may be made of rubber, polymer or other types of highly deformable material that easily can adapt to the exact geometry of the surface skin 32. Moreover, as will be shown in FIG. 8, it is feasible to introduce particular geometries for this layer that, for instance, can reduce its stiffness and constraining forces in particular directions. The contact layer is assumed to contact the surface skin at 61 without sliding. Its contact area 62 against the support block 63 is also assumed to contact without sliding. The support block 63 may be made of laminated wood or plastic as is common for support of cryogenic tanks, or even made of steel since its purpose here is mainly for support and not for thermal insulation. The support block 63 may be kept in fixed position with a surrounding "shoe" 64 or be guided to move in the direction of overall contraction by guide rails 65. In case of required sliding it is important that the contact surface 66 between the block 63 and the holding device 64 has as low friction as possible. The holding device is attached to the foundation 67, for instance an internal deck in a ship, by appropriate methods such as welding. Note also that regulations may require that the height of the open space 68 between the exterior surface of the tank 32 and the foundation 67 is sufficiently large for access for inspection which in fact will determine the height of the support block 63.

One of the suitable materials for the insulation material in the block elements 31 is reinforced polyurethane foam R-PUF. The strength of such material depends on density, amount of reinforcement and the manufacturer with typical compressive strength varying between 1 and 1.5 MPa. Let it be assumed that a significant safety factor is applied which results in allowable compressive stress of 0.4 MPa or 40 tons per $m^3$. Let us further assume that one considers support for an exceptionally large tank for storing liquid hydrogen LH2 with volume 10000 $m^3$. A typical weight of such tank assuming a lattice pressure vessel and filled with LH2 cargo could be about 800 tons. Assuming further that the tank is onboard a ship where additional inertia forces from ship motion gives a total weight to be carried by the supports being 1200 tons. This then means that about 30 $m^2$ of contact surface against the insulation blocks will be required for transferring the total load to the supports. Let it further be assumed that the contact surface against a single block is 3 $m^2$. This means that it is only necessary to have support under 10 element blocks to carry a 10000 $m^3$ LH2 tank with its cargo. The purpose of this calculated example is to show that it is highly realistic to implement the current invention during practical conditions. Clearly, other numbers apply for other applications.

Figure 5:
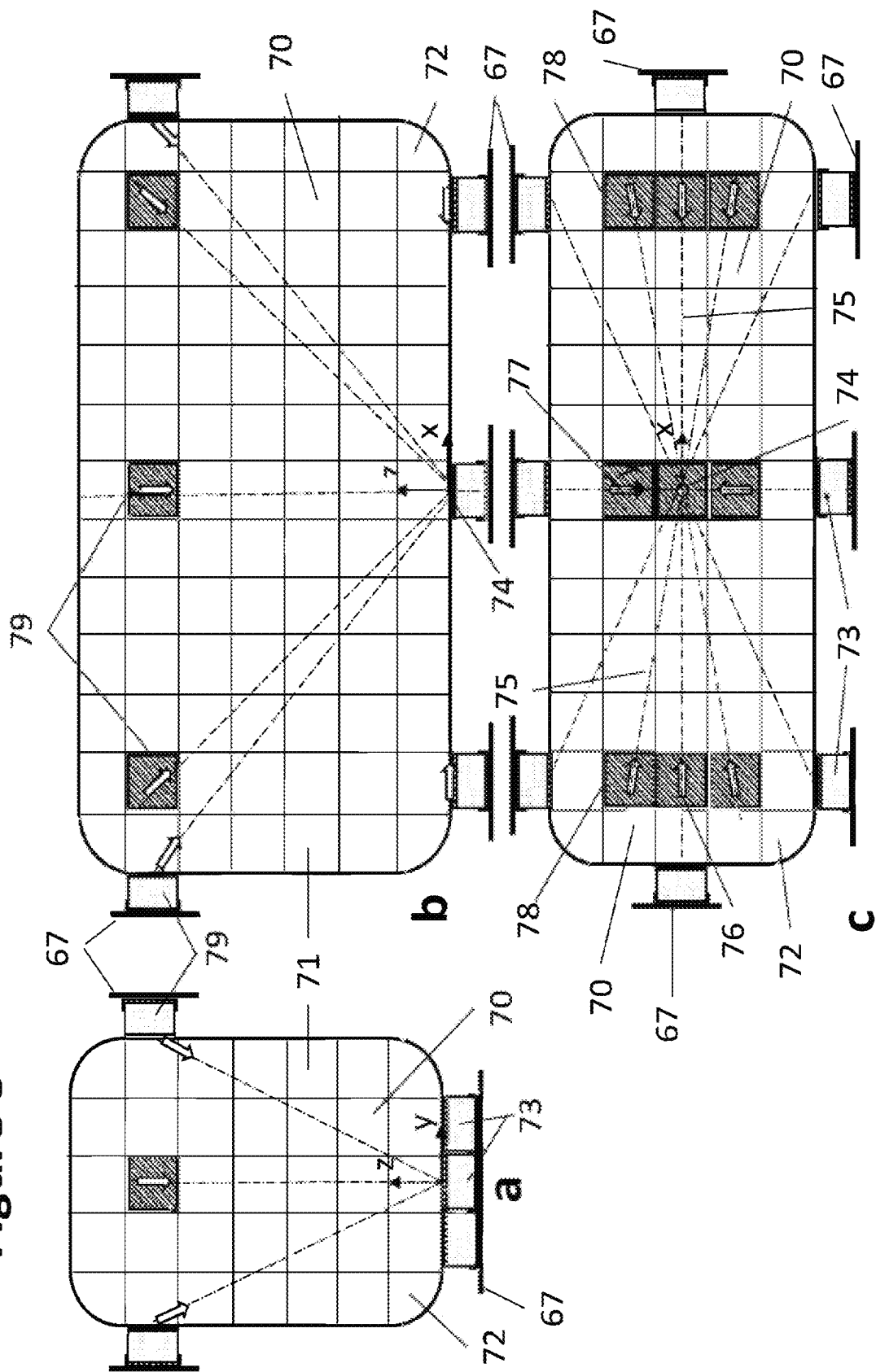
FIGS. 5a, b and c illustrate detail on overall thermal deformations, as a function on position on the tank.

FIG. 5 illustrates support of a compete tank according to the invention. FIG. 5a shows the short sides of the insulated tank (end view), 5b shows the long sides (side view), and 5c the tank seen from below (view from below). The case shown particularly applies to a tank onboard a ship, a floating offshore installation or other applications where the tank and support system is exposed to lateral loads in addition to gravitational forces. Clearly, lateral supports may not be required for most land-based tanks except for when potentially subjected to earthquake loads. The tank in the figure has moderate size; this is chosen to demonstrate the principles of support without unnecessary complexity. Assuming for instance that each block insulation has dimensions of about 2 m it simple to estimate the size of this particular example. Further, it appears that the tank is a so-called "flat-walled" lattice pressure vessel where all support sides are flat with flat insulation blocks 70 whereas side corners are covered with corners cylindrical block elements 71 and sharp corners with block elements of doubly curved geometry 72. 73 are support blocks of the type illustrated in FIG. 4 that have direct contact with the planar surfaces of the tank. It is important that the support contact surface do not get in contact with and damage the corrugations 33 shown in FIGS. 1, 2 and 3. Note also that there should be no sliding at the contact surface 61 between the insulation block and the support block.

Figure 6:
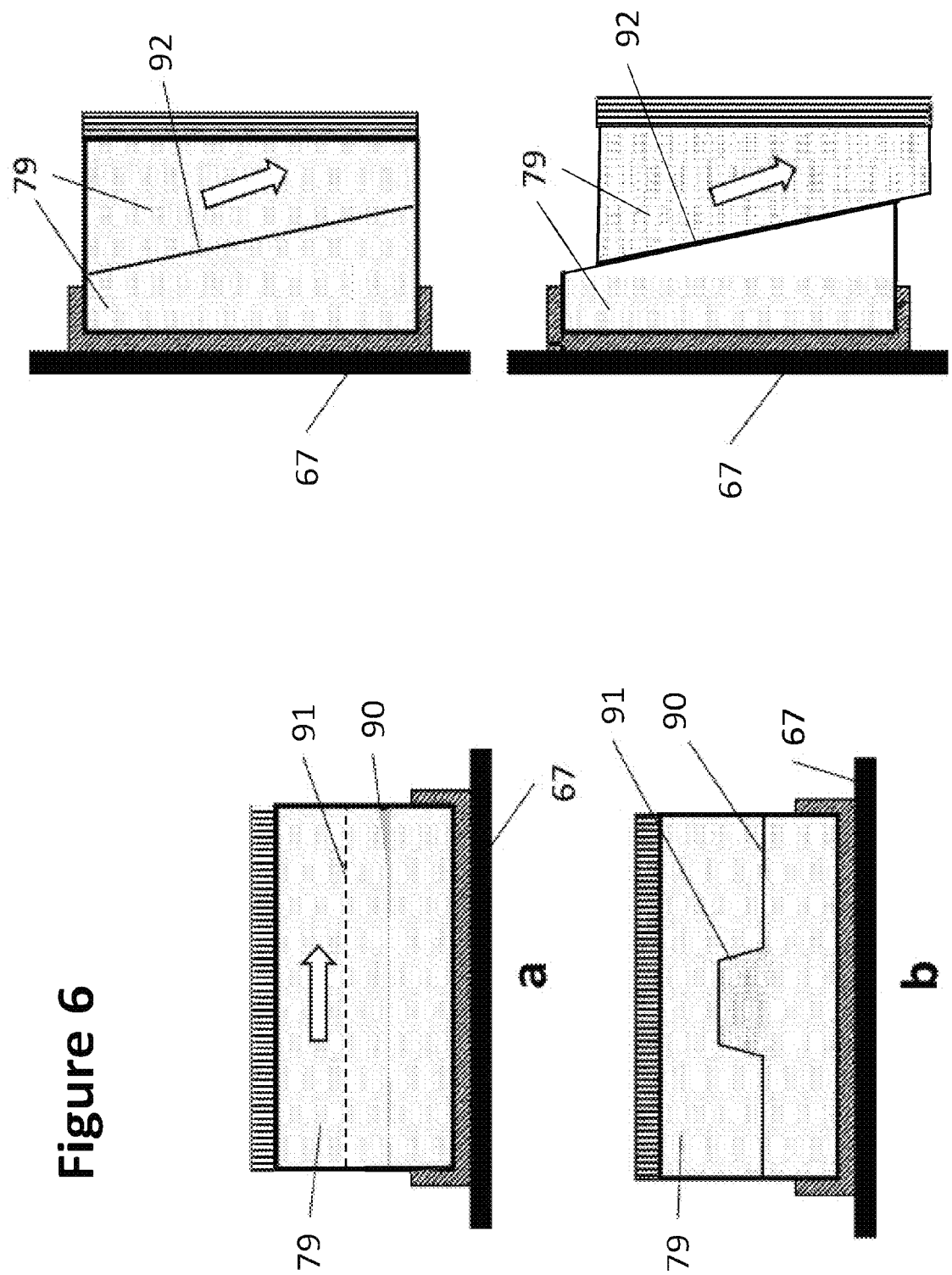
FIGS. 6a and b illustrate deformation within block elements.

Cryogenic tanks with or without internal pressure sustain significant thermal contraction, such as up to about 6 mm per meter for LH2 made of cryogenic steels. Such contraction must be made feasible by the design of the support block by allowing for sliding at the outward surface of the block (see 66 in FIG. 4), or possibly by having a sliding layer within the block itself as shown in FIG. 6. Clearly the tank supports must provide constraints against overall sliding and rotation of the entire tank. In FIG. 5c the midpoint 74 of the underside of the tank is chosen as a fixed point and the support block is held against sliding. The dotted lines 75 with arrows indicate the motion of the contact surfaces 64 will be in the direction of the fixed reference point 74. Mid-line support blocks such as 76 and 77 may thus be guided in direction midpoint 74 by simple means such as a sliding surface 90 with a furrow 91 in the support block, see two views in FIGS. 6a and 6b. An inserted steel plate in the sliding plane pointing in the sliding direction may serve a similar purpose. The corner support blocks 78 may also be guided in the direction of the dotted lines 75 or they may provide vertical support without lateral constraints.

The support blocks on the sides 79 in FIG. 5 serve the purpose on providing lateral support for the tank that is placed on a moving platform, such as a ship, and thereby exposed to additional lateral forces from heeling, wave motion and possibly accidental loads. As indicated by the dotted lines and arrows of contraction in the FIGS. 5a and 5b the tank surface of the tank against the support blocks may not only move parallel to the surface, but they may also have a component of inward motion normal to the surface itself. The sliding parallel to the surface can be dealt with in the same way as described for the supports under the tank. The motion component from contraction must however be dealt with in a different way to avoid that a gap opens between the tank and the lateral support block. Several methods are feasible for this purpose such as mechanical or hydraulic devices to compensate for normal contraction motion after the tank has been cooled down. Alternatively, the side supports may have a slanting internal sliding surface coincides with the direction of contraction corresponding to the dotted lines in the FIG. 5. A skew sliding surface 92 within the support block is indicated in FIG. 6c before contraction and in FIG. 6d after the contraction. The methods for compensating for contraction motion illustrate the overall feasibility of the block support approach of the invention.

It is known that other types of support devices to hold a tank against lateral forces and roll motion is customary being used for insulated tanks onboard ships. Such supports are typically mounted in the longitudinal plane above the fixed reference point and on top of the tank using a combination of steel supports, thermally insulating wood blocks, and sliding surfaces. Clearly such conventional anti-roll supports may be used as alternative to lateral supports shown as 79 in FIG. 5. However, there may be severe problems by this since conventional anti-roll supports have parts that must be welded to the inner tank and penetrate the surrounding insulation layer. Vacuum insulation is fully dependent on a leak-tight outer shell which here is represented by the outer corrugated skin 32. Due to significant thermal contraction and repetitive roll motion on ships it may be difficult to avoid cracking in the outer shell area near the supports and to maintain air tightness if such anti-roll devices are applied to large tanks with vacuum insulation. Thus, the presently proposed lateral support system is a preferred alternative.

Clearly the need for lateral supports depends not only on motion of foundation and loading conditions but also on the tank geometry itself and, in particular, on the shape of the tank bottom and the height to width ratio of the tank. Lattice pressure vessels with moderate height and with a flat bottom may not need lateral supports since lateral and overturning forces may be dealt with by the support system below the tank.

Figure 7:
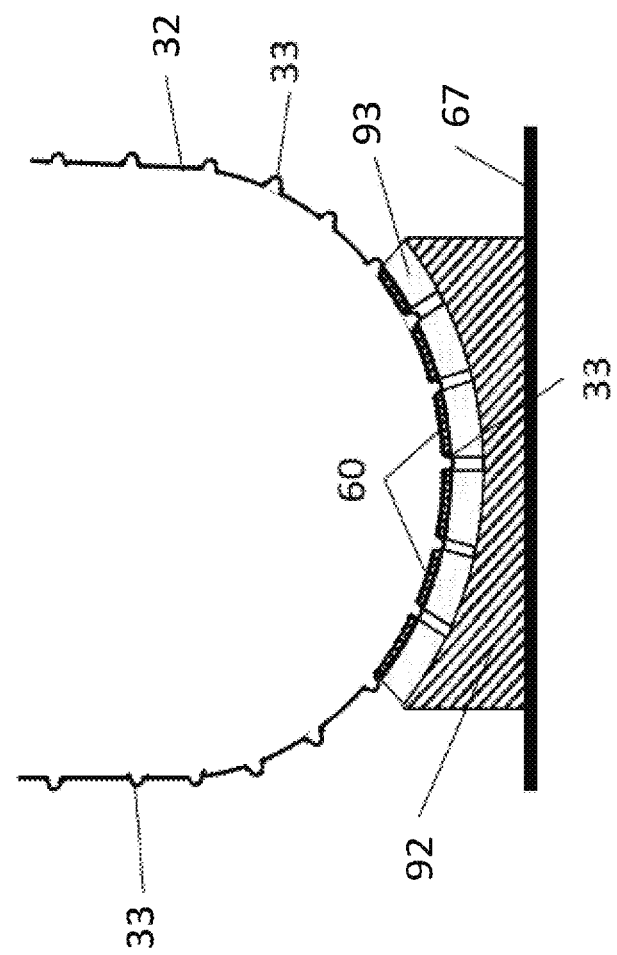
FIG. 7 illustrate an outer shell of a tank in a support structure in a tank system of the invention.

The invention can easily be implemented for various other types of tank supports, such as saddle type supports that are much used for cylindrical tanks and as well as for round side lattice pressure vessels. FIG. 7 shows a schematic outline of a saddle support 92 for a tank with vacuum block type insulation with an insulation block element skin 32 (part of outer shell over insulation block element) with outward corrugation 33, see also FIG. 2. The support blocks 93 resting on the saddle support have a cylindrical surface consistent with the geometry of the outer skin and the soft elastic contact layer. Small changes in geometry and radius caused by thermal contraction are easily dealt with by the deformability of the contact layer. Larger displacements cause by thermal contraction in the circumferential direction of the cylindrical geometry can be dealt with by a curved version of the sliding blocks shown in FIGS. 6a and 6b. Large contraction motion in the longitudinal direction of the cylindrical form can similarly be dealt with by sliding contact surfaces under the cradle, principally as shown in FIG. 5.

Figure 8:
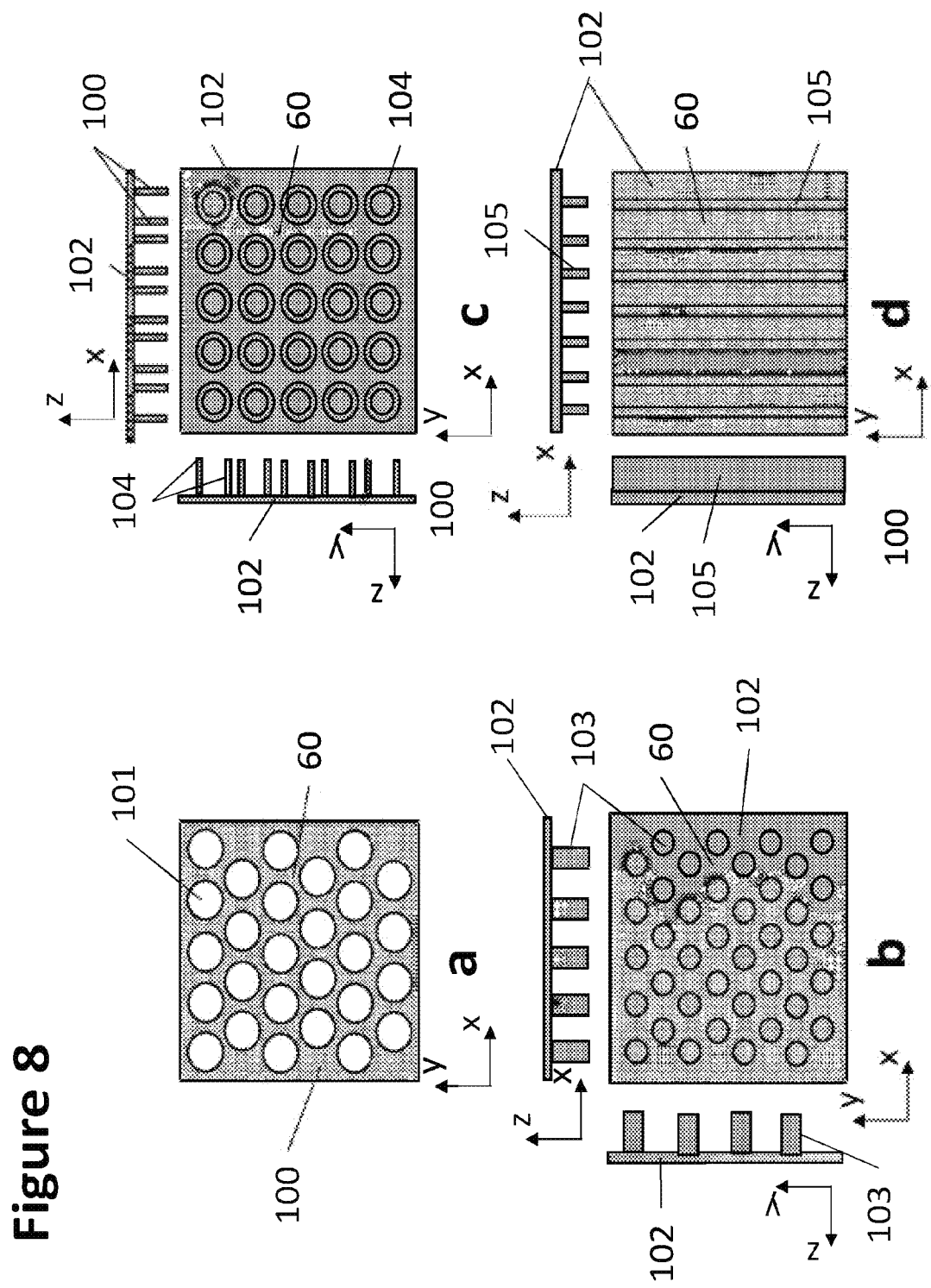
FIGS. 8a, b, c and d illustrate embodiments of soft support layer in between block elements and tank insulation block elements or outer shell areas covering insulation block elements in a tank system of the invention.

FIG. 8 illustrates some alternative solutions that provide extra flexibility of the contact layer 32 and that can be used both for flat and curved block supports. A property of elastomers is that they typically have low modulus of elasticity (Youngs modulus E) and high deformability whereas they also have a high ratio of transverse strain (Poisson's ratio ν) which may be close to 0.5 which makes the material nearly incompressible (volumetrically very stiff). Thus, a layer of rubber that is constrained and squeezed between two same shape surfaces becomes extremely stiff in the direction of pressure. This may be a concern for use of such material within the current invention since it is desirable that the intermediary contact layer should be able to adapt to uneven and shape changing surfaces and preferably also allow some local transverse motion in compliance with local thermal contraction. Fortunately, it is rather easy to adjust the stiffness characteristics of an elastomer layer by augmenting the geometry. FIG. 8 suggests some ways that can be suitable for application within the present support system of the invention. In FIG. 8*a* a thick elastomer plate 100, corresponding to 60 in previous figures, is cast and perforated with a regular or staggered pattern of penetrating holes 101. The material properties, the thickness of the plate, the diameter of the holes, and the distance between the holes determine the normal stiffness and the lateral shearing stiffness of the layer, whereby optimal stiffness performance in the three spatial directions may be derived. FIG. 8*b* shows a soft elastomer layer 60 that consists of a plate 102 facing the tank with cylindrical studs 103 in contact with the support block as in FIGS. 5, 6 and 7. The diameter and length of the studs determine the normal and lateral stiffness. Note that an originally flat plate of this type can easily be bent into cylindrical shape as needed for curved surfaces of the insulated tank. FIG. 8*c* shows a slightly modified version where each cylindrical stud 104 is hollow. Clearly, such studs can provide even softer performance of the intermediary support layer than in the previous case. FIG. 8*d* differs in the sense that it provides different lateral stiffness in the two directions of the contact plane. 104 indicate ribs or lamellas that provide significant stiffness in the normal and the longitudinal directions of the lamellas, here shown as y and z directions, whereas the stiffness in the x direction, normal to the lamellas may be very low. Clearly the actual stiffness depends on lamella height, width, and distance. The significance of this version is that it can be very compliant and allowing for significant thermally initiated displacement in the x-direction while it provides adequate stiffness and strength in the two other directions. Depending on the size of the tank and supports as well as the actual thermal contraction of the tank, use of softened intermediary layers, as shown in FIG. 8, may be sufficient to provide for transverse displacement in single supports or rows of block supports, as in FIG. 5 or a saddle support, as in FIG. 7. This means that thermal contraction can in some cases be dealt with by the soft contact layer rather than by providing sliding of the supports themselves.

The present invention provides significant advantages regarding manufacturing, transport, handling and installment of vacuum type, thermally insulated tanks referred to herein. Normally the main containment tank, the inner tank, preferably a pressure tank, is produced in a specialized manufacturing facility or construction yard. A common procedure is to lift the tank by way of preliminary lifting lugs welded to the tank surface, transported on intermediary supports on a barge or other type of vehicle, and thereafter set down placed on the permanent support system in its final location, such as within a ship. Except for the case of conventional, double shell, vacuum tanks with integrated, stiff outer shell, the application of the thermal insulation for cryogenic tanks normally takes place after final placing of the tank. There are several complexities associated with this, particularly in connection with operations like lifting, installation and overall sealing of tank and piping at the place of installment. The present invention allows, as an alternative, for full completion of tank with completed vacuum insulation and supports at the special manufacturing facility.

Figure 9:
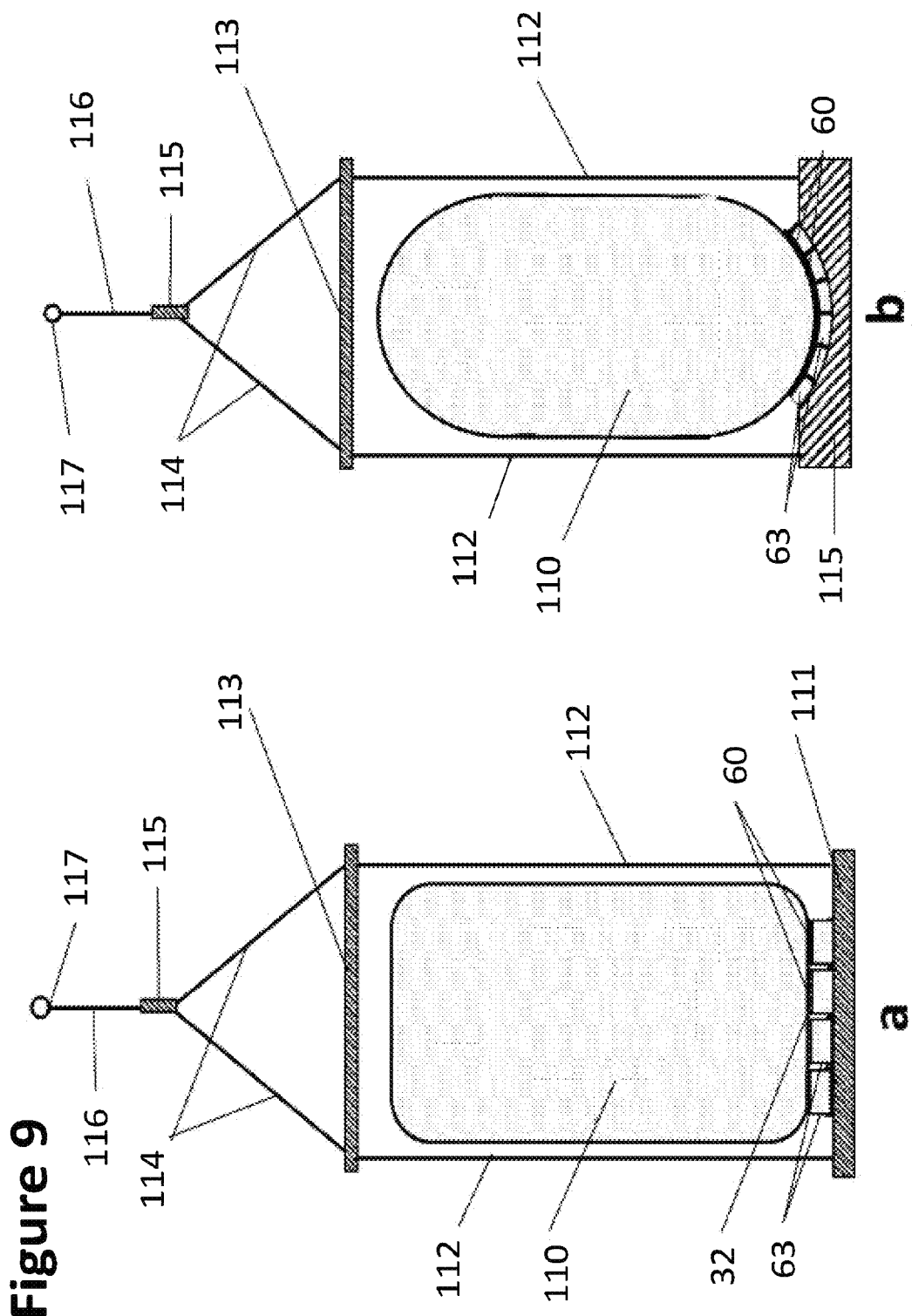
FIGS. 9a and b illustrate tank systems of the invention, as lifted by the support structure.

FIG. 9 illustrates this approach which easily implies significant savings in cost and time as well as better quality of production. FIG. 9*a* shows a case like what is shown in FIG. 5 which could typically be a lattice pressure vessel with flat sides and the block type vacuum insulation. The fully completed tank 110 stands on block supports 63 with soft layers 60 supporting the surface skin 32 of the tank, see also FIG. 4. The block supports are mounted on a common support structure 111 which, together with the block supports, make out the final support system for that section of the tank. Note that 111 extends beyond the sides of the tank such that there is room for the lifting cables 112. FIG. 5 shows an example with 3 such rows of support. Having a common support structure 110 facilitates an efficient way of lifting, transporting and installment of the completed tank since lifting wires, chains or straps 112 can easily be attached to the support structure 111. The figure also shows an intermediary lifting beam or frame type spreader structure 113 on which the listing wires are attached. The lifting frame 113 is similarly connected with lifting wires 114 that assemble these to a common lifting point or beam 115 which in turn is connected by wires 116 to a common lifting point 117 for a crane. This is an example that illustrates that it is fully feasible to prefabricate a vacuum insulated tank with support system and install this in its final position for use. FIG. 9*b* shows a lifting operation similar to the previous case with the only difference that the support structure is of saddle type. Clearly, the specific lifting devices may in practice differ from what is shown in FIG. 9 according to available lifting and handling capabilities of equipment and regulatory requirements.

The tanks for LH2, with vacuum insulation inside an outer shell that is airtight, is the most challenging embodiment and is therefore exemplified in detail. However, the benefits of the invention will exist also for less demanding tank embodiments and uses, for which reason also simpler tank systems are claimed by the scope of protection provided. Enabling disclosure for simpler tank systems and uses are as for the LH2 tank, but some features or steps may be omitted depending on the specific case.

The invention claimed is:

1. An insulated tank system, comprising:
    an inner tank;
    thermal insulation external to the inner tank;
    an inlet and an outlet or a combined inlet and outlet from outside the tank to inside the inner tank, for filling and emptying of fluid;
    wherein the inner tank contains fluid when installed and in operation, further comprises:
    thermal insulation in the form of insulation block elements arranged side by side externally on the inner tank, with a gap between the insulation block elements at least on the external side thereof, wherein the tank system further comprises a support structure comprising one or more block elements;
    wherein each block element faces and contacts an insulation block element, directly or via one or more intermediate layers;
    wherein the support structure comprises a structure for lifting the tank via the support structure;
    wherein the tank can be lifted and handled by merely loading the external insulation block elements facing the block elements without directly loading the inner tank;
    wherein thermal contraction or expansion are taken up by sliding and by gaps between the block insulation elements;

wherein the insulated tank system further comprises:
an outer shell that is airtight and is covering the external insulation;
wherein parts of the outer shell covering the insulation block elements have a shape matching an external shape of the respective insulation block element and are fastened to the respective insulation block element;
wherein the parts of the outer shell covering the gaps between the insulation block elements have a curved shape as seen along the respective gaps; and
wherein the curved shape comprises at least one of a cosine-like shape and a superimposed cosine like shape where two gaps crosses, allowing thermal contraction or expansion of the tank being compensated at the outer shell by local bending of the curved parts spanning the gaps.

2. The insulated tank system according to claim 1, further comprising a coupling to an opening through the outer shell to the insulation, for coupling a vacuum pump thereto for evacuating gas in the insulation for having vacuum in the insulation between the outer shell and the inner tank when the tank is in operation.

3. The insulated tank system according to claim 1, comprising a layer of elastomeric material between the block element and the block insulation element, for smooth force transfer and geometric compatibility during operation.

4. The insulated tank system according to claim 1, comprising block elements able to slide laterally to compensate for overall thermal deformation of the tank without any sliding at a contact surface between an outer shell and the block elements.

5. The insulated tank system according to claim 1, comprising block elements on a side of the tank to secure stability of the tank when subjected to static and/or dynamic motion and inertia forces.

6. The insulated tank system according to claim 1, comprising at least one of mechanical and hydraulic means and block elements with a sliding layer, for securing contact between an outer shell and the block elements.

7. The insulated tank system according to claim 1, comprising a support structure with frames or beams with lifting points at positions laterally out from under the tank as standing on a foundation, facilitating lifting and transport of the tank without structure connected directly to the inner tank.

8. The insulated tank system according to claim 1, wherein the number of thermal insulation block elements is adapted to ensure that stress on the insulation and the outer shell at all times is below acceptable limits as governed by an International Gas Code.

9. A method of fabricating a tank according to claim 1, comprising;
fabricating or providing an inner tank;
arranging insulation block elements side by side on the inner tank, with a gap in between the insulation block elements;
fabricating or providing an inlet and an outlet, as one combined or separate structures;
fabricating or providing an airtight outer shell structure with a coupling for a vacuum pump, if included in the tank embodiment; and
fabricating or providing at least one support structure for operatively building or connecting to the tank, wherein the support structure comprises one or more block elements, each block element has shape matching a specific insulation block element, wherein the support structure further comprises mechanical structure for lifting and transporting the tank without any lifting attachments penetrating the insulation layer to be directly connected with the inner tank.

10. The method according to claim 9, wherein the tank is fabricated in parts and assembled at a fabrication site or in a ship or on a floating platform.

11. The method according to claim 9, wherein the tank and vacuum insulation if present, is leakage tested at the fabrication site before transport and installment at its final destination.

12. An insulated tank system, comprising:
an inner tank;
thermal insulation external to the inner tank;
an inlet and an outlet or a combined inlet and outlet from outside the tank to inside the inner tank, for filling and emptying of fluid;
wherein the inner tank contains fluid when installed and in operation, further comprises:
thermal insulation in the form of insulation block elements arranged side by side externally on the inner tank, with a gap between the insulation block elements at least on the external side thereof, wherein the tank system further comprises a support structure comprising one or more block elements;
wherein each block element faces and contacts an insulation block element, directly or via one or more intermediate layers;
wherein the support structure comprises a structure for lifting the tank via the support structure;
wherein the tank can be lifted and handled by loading the external insulation block elements facing the block elements without directly loading the inner tank; and
wherein thermal contraction or expansion are taken up by sliding and by the gaps between the block insulation elements, the gaps comprising a layer of elastomeric material between the block element and the block insulation element, for smooth force transfer and geometric compatibility during operation.

13. The insulated tank system of claim 12, further comprising an outer shell that is airtight and is covering the external insulation, wherein the parts of the outer shell covering the insulation block elements have a shape matching an external shape of the respective insulation block element and is fastened to the respective insulation block element, and the parts of the outer shell covering the gaps between the insulation block elements have a curved, cosine-like shape as seen along the respective gaps, and a superimposed cosine like shape where two gaps cross, allowing thermal contraction or expansion of the tank being compensated at the outer shell by local bending of the curved parts spanning the gaps.

14. The insulated tank system according to claim 12, further comprising a coupling to an opening through the outer shell to the insulation, for coupling a vacuum pump thereto for evacuating gas in the insulation for having vacuum in the insulation between the outer shell and the inner tank when the tank is in operation.

* * * * *